US012747989B2

(12) United States Patent
Kim et al.

(10) Patent No.: US 12,747,989 B2
(45) Date of Patent: Sep. 29, 2026

(54) OPTICAL WAVELENGTH MEASURING DEVICE USING ABSORPTION-TYPE OPTICAL FIBER-BASED MULTIPLE OPTICAL FIBER FILTER MODULE, OPTICAL SENSOR SYSTEM HAVING THE SAME, AND OPTICAL MEASUREMENT METHOD

(71) Applicant: Six Fiber Systems Inc., Gwangju (KR)

(72) Inventors: Bok Hyeon Kim, Gwangju (KR); Chang Won Lee, Gwangju (KR)

(73) Assignee: Six Fiber Systems Inc., Gwangju (KR)

( * ) Notice: Subject to any disclaimer, the term of this patent is extended or adjusted under 35 U.S.C. 154(b) by 128 days.

(21) Appl. No.: 18/615,670

(22) Filed: Mar. 25, 2024

(65) Prior Publication Data

US 2024/0280412 A1 Aug. 22, 2024

Related U.S. Application Data

(63) Continuation of application No. PCT/KR2022/018629, filed on Nov. 23, 2022.

(30) Foreign Application Priority Data

Nov. 25, 2021 (KR) ........................ 10-2021-0164940
Nov. 23, 2022 (KR) ........................ 10-2022-0158270

(51) Int. Cl.
*G01J 9/02* (2006.01)

(52) U.S. Cl.
CPC ....... *G01J 9/0246* (2013.01); *G01J 2009/023* (2013.01); *G01J 2009/0261* (2013.01)

(58) Field of Classification Search
CPC ............... G01J 9/0246; G01J 2009/023; G01J 2009/0261; G01J 3/02; G01D 5/353; G02B 6/293
See application file for complete search history.

(56) References Cited

U.S. PATENT DOCUMENTS

2005/0046860 A1* 3/2005 Waagaard .......... G01D 5/35383 356/478
2006/0153520 A1* 7/2006 Murphy ............... H04B 10/071 385/147
2017/0205256 A1* 7/2017 Kim .......................... G01J 1/04

FOREIGN PATENT DOCUMENTS

KR 10-1072747 B1 10/2011
KR 10-1481814 B1 1/2015
KR 10-2015-0146468 A 12/2015

OTHER PUBLICATIONS

International Search Report issued in PCT/KR2022/018629; mailed Mar. 17, 2023.

* cited by examiner

*Primary Examiner* — Jonathan M Hansen
(74) *Attorney, Agent, or Firm* — Bridgeway IP Law Group, PLLC; Jihun Kim

(57) ABSTRACT

The present disclosure relates to an optical wavelength measuring device using an absorption-type optical fiber-based multiple optical fiber filter modules, an optical sensor system having the same, and an optical measurement method. The An optical wavelength measuring device includes a first optical splitter splitting the signal light provided from the optical fiber sensor into first and second split lights, a first optical detection unit detecting the first split light output from the first optical splitter, a polarization controller installed on an optical path of the second split light output from the first optical splitter, and controlling a polarization state of the second split light, a second optical detection unit detecting the second split light which is polarization-controlled by the polarization controller, and a calculation module calculating an optical wavelength of the signal light according to a physical quantity applied to the optical fiber sensor.

21 Claims, 10 Drawing Sheets

OPTICAL WAVELENGTH MEASURING DEVICE USING ABSORPTION-TYPE OPTICAL FIBER-BASED MULTIPLE OPTICAL FIBER FILTER MODULE, OPTICAL SENSOR SYSTEM HAVING THE SAME, AND OPTICAL MEASUREMENT METHOD

CROSS-REFERENCE TO RELATED APPLICATIONS

This application is a continuation of International Patent Application No. PCT/KR2022/018629, filed on Nov. 23, 2022, which claims the priority of Korean Patent Application No. 10-2021-0164940 and NO. 10-2022-0158270 filed on Nov. 25, 2021 and Nov. 23, 2022, in the Korean Intellectual Property Office, the disclosure of which is incorporated herein by reference.

BACKGROUND OF THE INVENTION

Field of the Invention

The present invention relates to an optical wavelength measuring device using an absorption-type optical fiber-based multiple optical fiber filter modules, an optical sensor system having the same, and an optical measurement method, and more particularly, to an optical wavelength measuring device measuring and analyzing light signal provided from an optical fiber sensor using a plurality of optical absorption-type optical fiber filter, an optical sensor system having the same, and an optical measurement method.

Description of the Related Art

Unlike existing electrical sensors, optical sensors, including optical fiber sensors, use light as a measurement means, enabling safe measurement without the risk of fire due to electrical sparks or short circuits in a sensing unit. Additionally, unlike the electrical sensors, the optical fiber sensors are immune to electromagnetic interference, so it is easy to apply a high-voltage electric power systems. Additionally, since the optical fiber sensors measure using optical fibers, multiple measurements and remote measurements are easy. In addition, the sensing unit of the optical fiber sensor has an advantage of being miniaturized. In addition, the optical fiber sensors are generally characterized in that they are made entirely or partially of glass optical fibers with strong chemical durability.

For example, an optical sensor system using optical fiber devices such as an optical fiber grating can be used to measure various types of physical quantities such as temperature, strain, vibration, and pressure. That is, in the case of the optical fiber sensor, an optical band-type optical signal is generally made in the sensing unit, and physical quantities are calculated using the optical signal. A center (resonance) wavelength of the optical band moves according to the external physical quantities applied to the sensing unit, such as temperature, strain, and pressure, and this is measured to calculate the physical quantities.

In the case of an optical fiber sensor system using an optical device as the sensing unit, a band-type optical signal is generated in the sensing unit, and the physical quantity is calculated by measuring the shift of a center wavelength of the signal light due to environmental changes, so a measurement device which detects a wavelength change and derives the physical quantity therefrom is required.

For this purpose, in the prior art, an optical characteristic analysis device capable of calculating optical wavelengths using interrogation technology based on passive optical elements such as bulk optic filters, optical fiber couplers, and optical fiber gratings, and an optical fiber sensor technology using the same have been proposed.

FIG. 1 illustrates an optical fiber sensor system based on an optical characteristic measurement device using a bulk optic filter according to the prior art. In this case of the prior art, the bulk optic filter with an optical absorption characteristic of a constant slope is used to measure optical wavelength. The optical fiber sensor system using this technology has a disadvantage of requiring additional optical components such as a collimator and an optical alignment process, which requires a relatively large amount of time and cost.

And there is a disadvantage that additional housing parts are required to protect these bulk-optic optical components from contamination and external vibration and to realize stable optical characteristics. In addition, the bulk optic filter used in this technology is generally manufactured by depositing multilayer of thin films on a substrate material by a high vacuum deposition process and coating anti-reflection layers to reduce light loss due to reflection occurring on surfaces exposed to air, and these has a disadvantage of requiring various expensive process operations. In addition, when interrogation performance is implemented using the bulk optic filter, there is a disadvantage that it is difficult to additionally manage the thickness of the device as a means of controlling the light absorption intensity and slope.

Meanwhile, FIG. 2 illustrates an optical fiber sensor system based on an optical characteristic measurement device using a long period fiber grating according to the prior art. This technology uses a long-period optical fiber grating as a filter element to measure the wavelength and analyze the characteristics of the optical fiber sensor. In the case of this method, it is advantageous in that no optical alignment is required, but it is difficult to reproducibly manufacture optical fiber gratings with the same characteristics. In addition, it is disadvantageous in that the optical characteristics of long-period optical fiber gratings used as filter elements are very sensitive to vibration and temperature and showing polarization-dependent characteristics.

Meanwhile, FIG. 3 illustrates an optical characteristic measurement structure using a single absorption-type optical fiber filter module according to the prior art. In the case of the prior art, the optical characteristic measurement structure is constituted by a light source unit, an optical branch unit, a light detection unit, and a signal analysis unit. The optical branch unit is constituted by two optical splitting elements, and one of two optical output units of a final optical splitting element is directly connected to an optical detector to measure a reference optical signal, and the remaining one is connected to the optical absorption-type optical fiber filter to measure an optical signal that is monotonically attenuated according to the center wavelength of the optical signal. According to the prior art, the central wavelength of an optical signal generated from an optical sensor device for example an optical fiber grating sensor can be measured by comparing the light intensities of the reference optical signal and the optical signal attenuated by the optical fiber filter. In the case of the prior art, it consists of a single optical fiber filter module made of one optical splitting element and one absorption-type optical fiber filter. However, the optical characteristic measurement device using a conventional single absorption optical fiber filter module has a disadvantage of optical output power instability and optical signal fluctuation due to polarization instability.

SUMMARY OF THE INVENTION

The present invention is contrived to solve the problem, and has been made in an effort to provide an optical wavelength measuring device using an absorption-type optical fiber based multiple optical fiber filter modules capable of analyzing optical characteristics using optical signals measured using a plurality of optical absorption-type optical fiber filters, respectively, an optical sensor system having the same, and an optical measurement method.

In order to achieve the object, an exemplary embodiment of the present invention provides an optical wavelength measuring device using an absorption-type optical fiber based multiple optical fiber filter module, which measures signal light generated from an optical fiber sensor of an optical fiber sensor system, including: a first optical splitter splitting the signal light provided from the optical fiber sensor into first and second split lights; a first optical detection unit detecting the first split light output from the first optical splitter; a polarization controller installed on an optical path of the second split light output from the first optical splitter, and controlling a polarization state of the second split light; a second optical detection unit detecting the second split light which is polarization-controlled by the polarization controller; and a calculation module calculating a physical quantity applied to the optical fiber sensor based on information detected by the first and second detection units.

The first optical detection unit includes a second optical splitter splitting the first split light output from the first optical splitter into a first reference light and a first analysis light, a first optical detector detecting the first reference light output from the second optical splitter, a first optical fiber filter installed on an optical path of the first analysis light output from the second optical splitter, and a second optical detector detecting the first analysis light passing through the first optical fiber filter.

The first optical fiber filter preferably has optical absorption characteristics in a predetermined optical wavelength area.

Further, an optical absorption rate of the first optical fiber filter is linearly changed according to the optical wavelength.

The first and second optical detectors preferably detect optical intensities of the first reference light and the first analysis light.

The second optical detection unit includes a third optical splitter splitting the second split light polarization-controlled by the polarization controller into second reference light and second analysis light, a third optical detector detecting the second reference light output from the third optical splitter, a second optical fiber filter installed on an optical path of the second analysis light output from the third optical splitter, and a fourth optical detector detecting the second analysis light passing through the second optical fiber filter.

The second optical fiber filter has optical absorption characteristics in a predetermined optical wavelength area.

An optical absorption rate of the second optical fiber filter is preferably linearly changed according to the optical wavelength.

The third and fourth optical detectors detect optical intensities of the second reference light and the second analysis light.

Meanwhile, another exemplary embodiment of the present invention provides optical fiber sensor system including: a light source outputting input light; an optical fiber sensor installed in a measurement target, and receiving the input light from the light source and outputting signal light corresponding to a physical quantity change by the measurement target; and an optical wavelength measuring device detecting the signal light output from the optical fiber sensor and calculating a physical quantity applied to the optical fiber sensor, in which the optical wavelength measuring device includes a first optical splitter splitting the signal light provided from the optical fiber sensor into first and second split lights, a first optical detection unit detecting the first split light output from the first optical splitter, a polarization controller installed on an optical path of the second split light output from the first optical splitter, and controlling a polarization state of the second split light, a second optical detection unit detecting the second split light which is polarization-controlled by the polarization controller, and a calculation module calculating an optical wavelength of the signal light according to a physical quantity applied to the optical fiber sensor based on information detected by the first and second optical detection units.

Meanwhile, yet another exemplary embodiment of the present invention provides an optical measurement method including: an input light outputting step of outputting, by a light source, input light to an optical fiber sensor installed in a measurement target; a first light splitting step of receiving the signal light output to correspond to the physical quantity applied to the optical fiber sensor, and splitting the signal light into first and second split lights by using a first optical splitter; a first light receiving step of detecting the first split light split in the first light splitting step; a polarization control step of controlling a polarization state of the second split light split in the first light splitting step by using a polarization controller; a second light receiving step of detecting the second split light after the polarization control step; and a wavelength and physical quantity calculating step of finally calculating the physical quantity applied to the optical fiber sensor by calculating the optical wavelength of the signal light based on the detection information detected in the first and second light receiving steps.

The first light receiving step includes a second light splitting step of splitting the first split light into a first reference light and a first analysis light through a second optical splitter, a first light detecting step of detecting the first reference light split in the second light splitting step by using a first optical detector, a first filtering step of passing the first analysis light split in the second light splitting step through a first optical fiber filter, and a second light detecting step of detecting the first analysis light passing through the first optical fiber filter by using a second optical detector.

The first optical fiber filter preferably has optical absorption characteristics in a predetermined optical wavelength area.

An optical absorption rate of the first optical fiber filter is linearly changed according to the optical wavelength.

In the first and second light detecting steps, optical intensities of the first reference light and the first analysis light are detected, respectively.

The second light receiving step includes a third light splitting step of splitting the second split light into a second reference light and a second analysis light through a third optical splitter, a third light detecting step of detecting the second reference light split in the third light splitting step by using a third optical detector, a second filtering step of passing the second analysis light split in the third light splitting step through a second optical fiber filter, and a fourth light detecting step of detecting the second analysis light passing through the second optical fiber filter by using a fourth optical detector.

The second optical fiber filter has optical absorption characteristics in a predetermined optical wavelength area.

An optical absorption rate of the second optical fiber filter is preferably linearly changed according to the optical wavelength.

In the third and fourth light detecting steps, optical intensities of the second reference light and the second analysis light are detected, respectively.

According to the present invention, since an optical wavelength measuring device using an absorption-type optical fiber-based multiple optical fiber filter modules, an optical sensor system having the same, and an optical measurement method detect and analyze signal light input from an optical fiber sensor using a plurality of light absorption-type optical fiber filters, it is possible to more accurately measure optical wavelengths.

Further, according to the present invention, since a light absorption-type optical fiber filter technology is used, stable and accurate measure is possible by minimizing polarization dependency of an element which becomes a problem in a conventional optical system.

In addition, according to the present invention, there is an advantage in that it is possible to accurately measure wavelengths even under an external environmental condition in which vibration, pressure, temperature, etc., are frequently changed.

DETAILED DESCRIPTION OF THE PREFERRED EMBODIMENT

Figure 1:
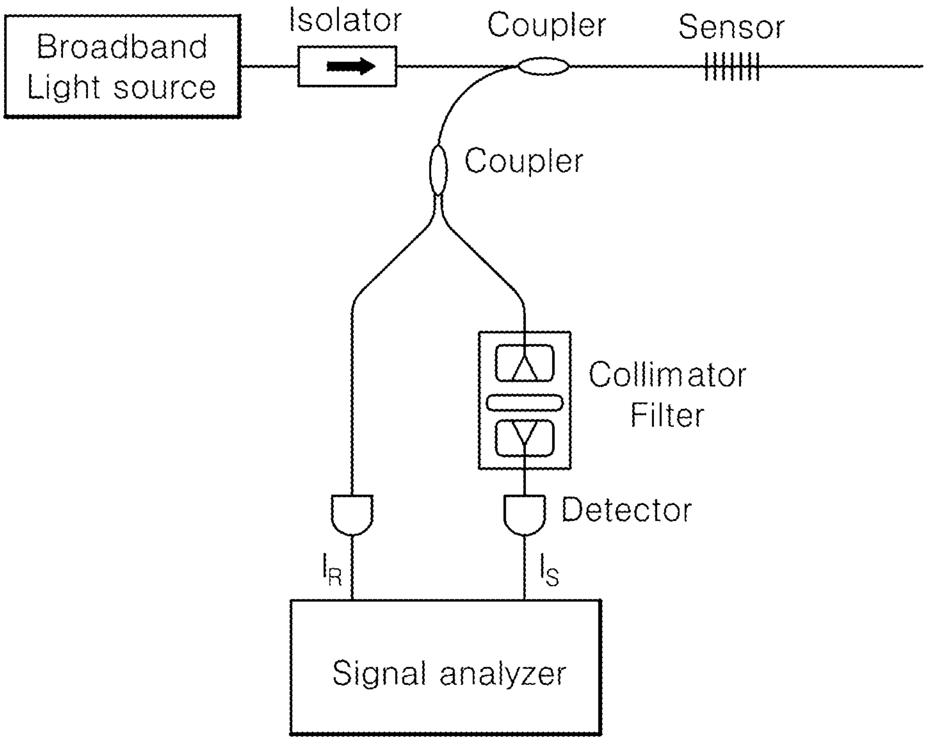
FIG. 1 is a conceptual view for an optical fiber sensor system based on an optical characteristic measuring device using a bulk optic filter element according to the prior art.
Figure 2:
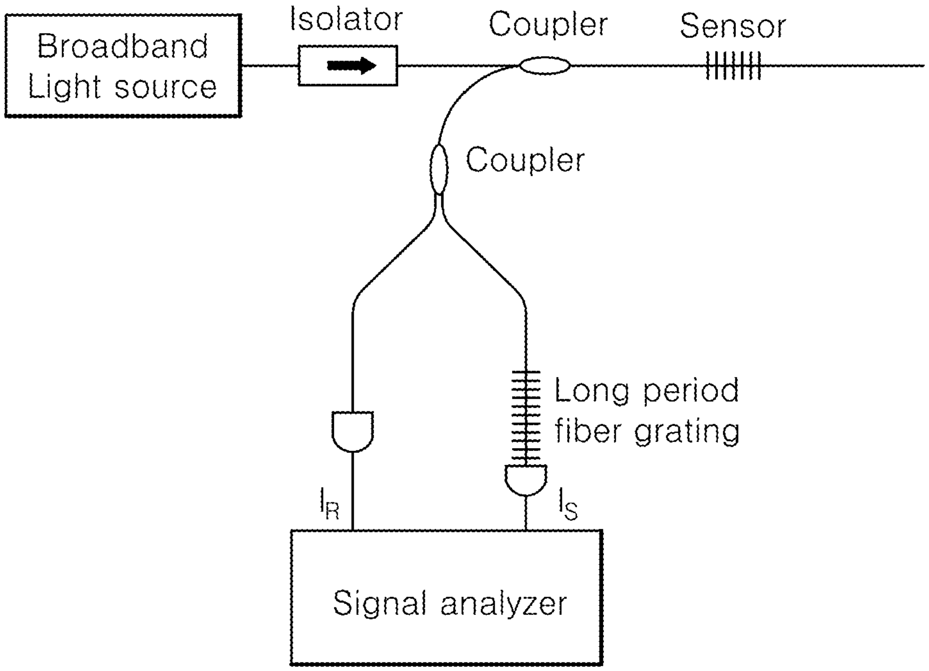
FIG. 2 is a conceptual view for an optical fiber sensor system based on an optical characteristic measuring device using a long period fiber grating according to the prior art.

Hereinafter, an optical wavelength measuring device using an absorption-type optical fiber-based multiple optical fiber filter modules, an optical sensor system having the same, and an optical measurement method according to exemplary embodiments of the present invention will be described in detail with reference to the accompanying drawings. The present invention may have various modifications and various embodiments and specific embodiments will be illustrated in the drawings and described in detail in the specification. However, this does not limit the present invention to specific exemplary embodiments, and it should be understood that the present invention covers all the modifications, equivalents and replacements included within the idea and technical scope of the present invention. In describing each drawing, reference numerals refer to like elements. In the accompanying drawings, the sizes of structures are illustrated while being enlarged as compared with actual sizes for clarity of the present invention.

Terms including as first, second, and the like are used for describing various components, but the components should not be limited by the terms. The terms are used only to discriminate one component from another component. For example, a first component may be referred to as a second component, and similarly, the second component may be referred to as the first component without departing from the scope of the present invention.

Terms used in the present application are used only to describe specific exemplary embodiments, and are not intended to limit the present invention. A singular form includes a plural form if there is no clearly opposite meaning in the context. In the present application, it should be understood that term “include” or “have” indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 4:
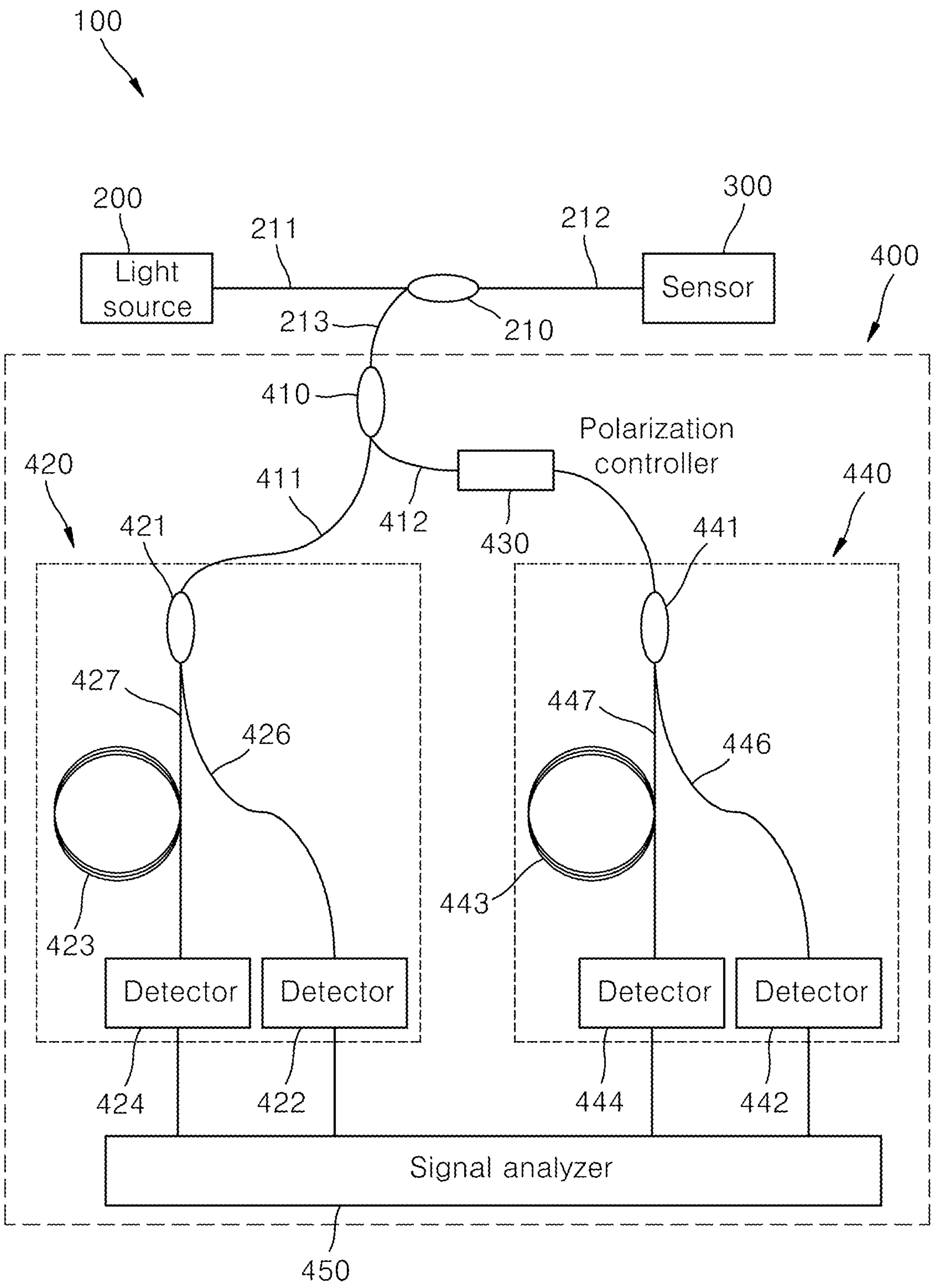
FIG. 4 is a conceptual view for an optical fiber sensor system according to the present invention.

FIG. 4 illustrates an optical sensor system 100 having an optical wavelength measuring device 400 using an absorption-type optical fiber based dual optical fiber filter module according to the present invention.

Referring to the drawing, the optical sensor system 100 includes a light source 200 outputting input light, an optical fiber sensor 300 installed in a measurement target, and receiving the input light from the light source 200 and outputting signal light corresponding to a physical quantity change by the measurement target, and an optical wavelength measuring device 400 detecting the signal light output from the optical fiber sensor 300 and calculating a physical quantity applied to the optical fiber sensor 300.

The light source 200, which outputs the input light to the optical fiber sensor 300, emits various wavelengths of light according to the measurement target or a physical amount to be measured. The light source 200 preferably has a predetermined optical bandwidth by considering that the optimal wavelength shifts according to the physical quantity applied to the optical fiber sensor 300. In this case, the light source 200 inputs the input light into the optical fiber sensor 300 through an optical branch element 210. Here, the optical branch element 210 makes the input light incident from the light source 200 be incident on the optical fiber sensor 300 through a first input terminal 211, and outputs signal light reflected by the optical fiber sensor 300 and inversely emitted through a first output terminal 212 through a second output terminal 213. Optical coupling element (optical coupler), optical splitting element (optical splitter), or optical dividing element (optical divider) having optical fiber waveguide or planar waveguide structure can be used for the optical branch element 210.

The optical fiber sensor 300 can adopt an optical fiber grating sensor (FBG) in which one end is connected to the first output terminal 212, and multiple gratings are formed in an optical fiber in a longitudinal direction. Meanwhile, the optical fiber sensor 300 receives the input light through the optical branch element 210, and outputs signal light of which wavelength is changed according to the physical quantity applied from the measurement target. When physical quantities such as temperature, tensile, pressure, bending, etc., are applied to the optical fiber sensor 300, the center wavelength of the signal light shitfs. Accordingly, the wavelength of the signal light reflected on the optical fiber sensor 300 is measured to analyze the change of the physical quantity applied to the optical fiber sensor 300.

The optical fiber sensor 300 may adopt an optical fiber grating sensor that generates signal light having a narrow optical bandwidth of hundreds of pm to several nm.

Meanwhile, the optical fiber sensor 300 is not limited thereto, but if the optical fiber sensor 300 is a sensor device using an optical fiber or an optical device capable of outputting signal light of which wavelength is changed according to a physical amount applied from the outside based on the input light from the light source 200, all sensor devices are applicable. For example, an optical device which has an optical bandwidth of dozens of pm to several nm, and has a center wavelength of the optical band which is changed according to the applied physical amount may be used as the sensor. As an example, an optical device such as a Fabry-Perot device may be used as the sensor device. Of course, it is preferable that the input and output terminals of the optical device used as the sensor are configured by the optical fiber in order to facilitate optical connection.

The optical wavelength measuring device 400 includes a first optical splitter 410 splitting the signal light provided from the optical fiber sensor 300 into first and second split lights, a first optical detection unit 420 detecting the first split light output from the first optical splitter 410, a polarization controller 430 installed on an optical path of the second split light output from the first optical splitter 410 and controlling a polarization state of the second split light, a second optical detection unit 440 detecting the second split light which is polarization-controlled by the polarization controller 430, and a calculation module 450 calculating the physical quantity applied to the optical fiber sensor 300 based on information detected by the first and second optical detection units 420 and 440.

The first optical splitter 410 is connected to a second output terminal 213 of the optical branch element 210, and receives the signal output from the optical fiber sensor 300. The first optical splitter 410 splits the signal light into the first and second split lights, and outputs the first and second split lights to third and fourth output terminals 411 and 412, respectively.

The first optical detection unit 420 includes a second optical splitter 421 splitting the first split light output from the first optical splitter 410 into a first reference light and a first analysis light, a first optical detector 422 detecting the first reference light output from the second optical splitter 421, a first optical fiber filter 423 installed on an optical path of the first analysis light output from the second optical splitter 421, and a second optical detector 424 detecting the first analysis light passing through the first optical fiber filter 423.

The second optical splitter 421 is connected to the third output terminal 411 of the first optical splitter 410, and splits the first split light input from the first optical splitter 410 into the first reference light and the first analysis light. The second optical splitter 421 outputs the first reference light and the first analysis light to a fifth output terminal 426 and a sixth output terminal 427, respectively.

The first optical detector 422 is connected to the fifth output terminal 426 of the second optical splitter 421, and detects the first reference light output from the fifth output terminal 426. Here, the first optical detector 422 receives the first reference light, and calculates a signal corresponding to the received first reference light. Further, the first optical detector 422 detects an optical intensity of the first reference light, and transmits detection information to the calculation module 450.

One end of the first optical filter 423 is connected to the sixth output terminal 427 of the second optical splitter 421, which filters the first analysis light input from the sixth output terminal 427. Here, the first optical fiber filter 423 has optical absorption characteristics in a predetermined optical wavelength area, and it is preferable that an optical absorption rate is linearly changed according to the optical wavelength. The first optical fiber filter 423 is manufactured so that an optical absorption intensity and it's slope satisfy characteristics of the system of the optical fiber sensor 300 by incorporating a material having a predetermined optical absorption characteristic in an optical fiber fabrication process, and controlling a length of the optical fiber or the type or a concentration of the incorporated material.

A material that induces the specific optical absorption characteristics has an optical absorption characteristic which is monotonously changed in a predetermined wavelength area. More preferably, the material that induces the specific optical absorption characteristics has an optical absorption characteristic which is linearly changed in a predetermined wavelength area. Accordingly, the material incorporated to the optical fiber to have the linear optical absorption characteristic is selected from rare earth elements, transition metal elements, and nanoparticles. Preferably, the rare earth elements are selected from a group consisting of Tm, Er, La, Ce, Pr, Nd, Pm, Sm, Eu, Gd, Tb, Dy, Ho, Yb, and Lu. More preferably, the rare earth elements may be selected from a group consisting of Tm, Er, Pr, Nd, Pm, Sm, Eu, Tb, Dy, Ho, and Yb having more excellent linear optical absorption characteristics in 200 to 2000 nm in which various optical devices are developed.

Meanwhile, the first optical fiber filter 423 is not limited thereto, but all filter devices having the monotonously changed optical absorption characteristics in the predetermined optical wavelength area are applicable with respect to the input light.

The second optical detector 424 is connected to the other end of the first optical fiber filter 423, and detects the first analysis light passing through the first optical fiber filter 423. Here, the second optical detector 424 receives the first analysis light, and calculates a signal corresponding to the received first analysis light. Further, the second optical detector 424 detects an optical intensity of the first analysis light, and transmits detection information to the calculation module 450.

The polarization controller 430 is installed in the fourth output terminal 412 of the first optical splitter 410, and controls the polarization state of the second split light output from the fourth output terminal 412, and transmits the second split light to the second optical detection unit 440. Since the polarization controller 430 is used as a polarization control means generally used in the prior art to output incident light by controlling a polarization state of the incident light to a predetermined polarization state, a detailed description is omitted. The polarization state may set a worker to have a predetermined state according to the measurement target or the characteristics of the optical fiber sensor 300.

The second optical detection unit 440 includes a third optical splitter 441 splitting the second split light polarization-controlled by the polarization controller 430 into second reference light and second analysis light, a third optical detector 442 detecting the second reference light output from the third optical splitter 441, a second optical fiber filter 443 installed on an optical path of the second analysis light output from the third optical splitter 441, and a fourth optical detector 444 detecting the second analysis light passing through the second optical fiber filter 443.

The third optical splitter 441 is connected to the polarization controller 430, and receives the second split light polarization-controlled by the polarization controller 430, and splits the input second split light into the second reference light and the second analysis light. The third optical splitter 441 outputs the second reference light and the second analysis light to a seventh output terminal 446 and an eighth output terminal 447, respectively.

The polarization state of the polarization controller 430 is set to compensate the perturbation of the optical signal according to fluctuation of optical intensities and polarization states of the light source, a guide optical fiber, and the optical element. For example, the optical intensity and polarization state fluctuation occurs by external disturbance applied to the light source, the guide optical fiber, or the optical element, and as a result, a split ratio of the first split light which the second optical splitter 421 into the first reference light and the first analysis light may be disturbed. In this case, a split ratio of the second split light which the third optical splitter 441 into the second reference light and the second analysis light is controlled by controlling the polarization state by using the polarization controller 430 according to the present invention to compensate the disturbance. Accordingly, finally, the calculation module 450 integrates and uses the first reference light, the first analysis light, the second reference light, and the second analysis light to enable accurate calculation of the wavelength and the physical quantity.

The third optical detector 442 is connected to the seventh output terminal 446 of the third optical splitter 441, and detects the second reference light output from the seventh output terminal 446. Here, the third optical detector 442 receives the second reference light, and calculates a signal corresponding to the received second reference light. Further, the third optical detector 442 detects an optical intensity of the second reference light, and transmits detection information to the calculation module 450.

One end of the second optical fiber filter 443 is connected to the eighth output terminal 447 of the third optical splitter 441, which filters the second analysis light input from the eighth output terminal 447. Here, the second optical fiber filter 443 has optical absorption characteristics in a predetermined optical wavelength area, and it is preferable that the optical absorption rate is linearly changed according to the optical wavelength. The second optical fiber filter 443 is preferably manufactured by the same process as the first optical fiber filter 423.

Optical coupling element (optical coupler), optical splitting element (optical splitter), or optical dividing element (optical divider) having optical fiber waveguide or planar waveguide structure can be used for the optical splitters 410, 421, and 441.

The fourth optical detector 444 is connected to the other end of the second optical fiber filter 443, and detects the second analysis light passing through the second optical fiber filter 443. Here, the fourth optical detector 444 receives the second analysis light, and calculates a signal corresponding to the received second analysis light. Further, the fourth optical detector 444 detects an optical intensity of the second analysis light, and transmits detection information to the calculation module 450.

The calculation module 450 receives optical signals for the first analysis light and the first reference light provided from the fist optical detection unit 420 and receives optical signals for the second analysis light and the second reference light provided from the second optical detection unit 440, and analyzes the received optical signals to calculate the physical quantity applied to the optical fiber sensor 300.

That is, the calculation module 450 may be used for comparing the optical intensity of the first reference light not passing through the first optical fiber filter 423 and the optical intensity of the first analysis light passing through the first optical fiber filter 423, and deriving the wavelength of the signal light by using the optical absorption characteristics of the first optical fiber filter 423.

Further, the calculation module 450 may be used for comparing the optical intensity of the second reference light and the optical intensity of the second analysis light provided from the second optical detection unit 440 with respect to the second split light which is polarization-controlled by the polarization controller 430, and deriving the wavelength of the signal light by using the optical absorption characteristics of the second optical fiber filter 443. The wavelength of the second split light may be derived. Here, the calculation module 450 compensates the polarization fluctuation in information on the wavelength of the first split light by using information on the second split light passing through the polarization controller 430 and the second optical fiber filter 443 to calculate the wavelength of the signal light output from the optical fiber sensor 300. Therefore, the calculation module 450 reduces optical intensity perturbation by compensating the polarization fluctuation through the first and second optical detection units 420 and 440, that is, by using a polarization control element and a dual optical fiber filter to enable more stable and accurate wavelength measurement, and provide an optical characteristic measuring device such as the optical fiber sensor system by using the same.

Figure 3:
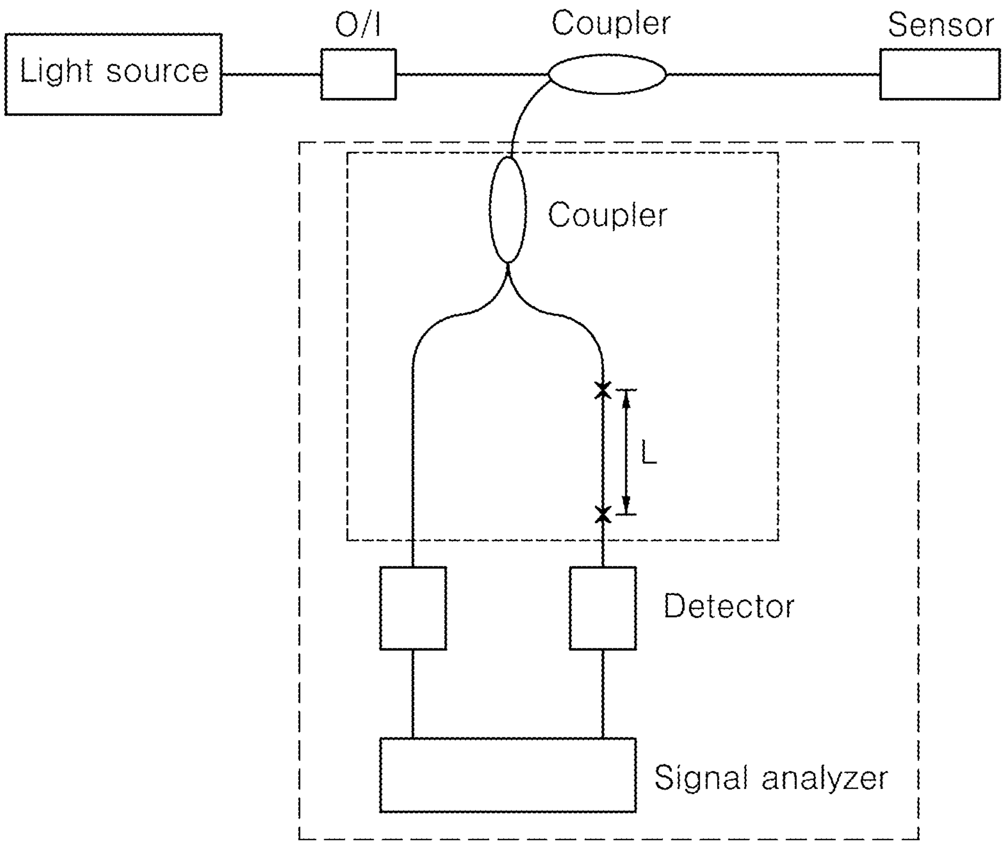
FIG. 3 is a conceptual view for an optical fiber sensor system using a single absorption-type optical fiber filter module according to the prior art.

In the case of the prior art, as illustrated in FIG. 3, an optical wavelength measuring device constituted by one optical splitter and one optical absorption-type optical fiber filter is used. In the case of the light source, the guide optical fiber, and the optical device used in the optical fiber sensor system, the optical intensity and the polarization may fluctuate due to temperature change, vibration, bending, etc. Accordingly, the optical wavelength measuring device according to the prior art has a disadvantage in that an optical signal perturbation phenomenon occurs due to the fluctuation of the optical intensity and the polarization state. The optical split ratio of the optical splitter used in the optical fiber sensor system may be affected by the fluctuation, and when the optical split ratio of the optical splitter is affected, the optical intensities of the reference light and the analysis light are disturbed, making it difficult to accurately measure the wavelength. On the contrary, in the case of the optical characteristic measuring device and the optical fiber sensor system using the same according to the present invention, since two optical absorption-type optical fiber filters are used, it is possible to remove the perturbation of the optical signal due to the polarization fluctuation through compensation, and more stably and accurately measure the wavelength.

More specifically, the optical splitter may adopt an optical coupling device (optical coupler), an optical splitting device, or optical dividing element having an optical fiber waveguide or planar optical waveguide structure, and in the case of the optical elements, the structural or optical symmetry of the device is not perfect, so the optical split ratio may not be constant depending on the polarization state. Therefore, if the polarization state of the signal light incident on the optical splitter is not constant, the optical split ratio of the optical splitter may be disturbed, which may interfere with accurate wavelength measurement.

Here, the calculation module 450 may derive the physical quantity applied to the optical fiber sensor 300 according to external environmental changes such as temperature, strain, pressure, bending, torsion, refractive index, and concentration, etc., from the wavelength of the derived wavelength of the signal light.

According to the present invention, since the wavelength is calculated from a ratio of two pairs of optical intensities measured by the first and second optical detection units 420 and 440 with the optical fiber filters, respectively, a problem in that the optical split ratio is affected by fluctuation of an output of the light source 200 which occurs in the prior art and a change in optical loss which occurs in the guide optical fiber, and a change in polarization which occurs by optical fiber bending may be solved as illustrated in FIG. 3. According to the present invention, as the optical wavelength is calculated from a ratio of two pairs of optical intensities measured by the first and second optical detection units 420 and 440 with the optical fiber filters are provided, respectively, and it has compensation characteristics for the fluctuation and signal distortion, so it is possible to more accurately calculate the wavelength. The calculation module 450 calculates the optical signal of the signal light by using Equation 1 below.

$$R = a\log_k[(I_1 + I_2)/(I_3 + I_4)] + b \qquad \text{[Equation 1]}$$

Here, k represents a base of a logarithmic function, a and b represent a proportionality constants and a constant, $I_1$ and $I_3$ represent the optical intensity of the first reference light and the optical intensity of the first analysis light detected by the first optical detection unit 420, respectively, and $I_2$ and $I_4$ represent the optical intensity of the second reference light and the optical intensity of the second analysis light detected by the second optical detection unit 440, respectively. Therefore, the present invention enables more stable and accurate wavelength measurement by integrating and calculating the optical signals detected using two optical fiber filters using Equation 1.

In other words, according to the present invention, the wavelength is calculated from two pairs of optical intensities measured by two optical fiber filter modules, respectively, and this method has the characteristic of compensating for signal distortion caused by the fluctuation in light intensity and polarization state, making it possible to accurately calculate the wavelength.

Figure 5:
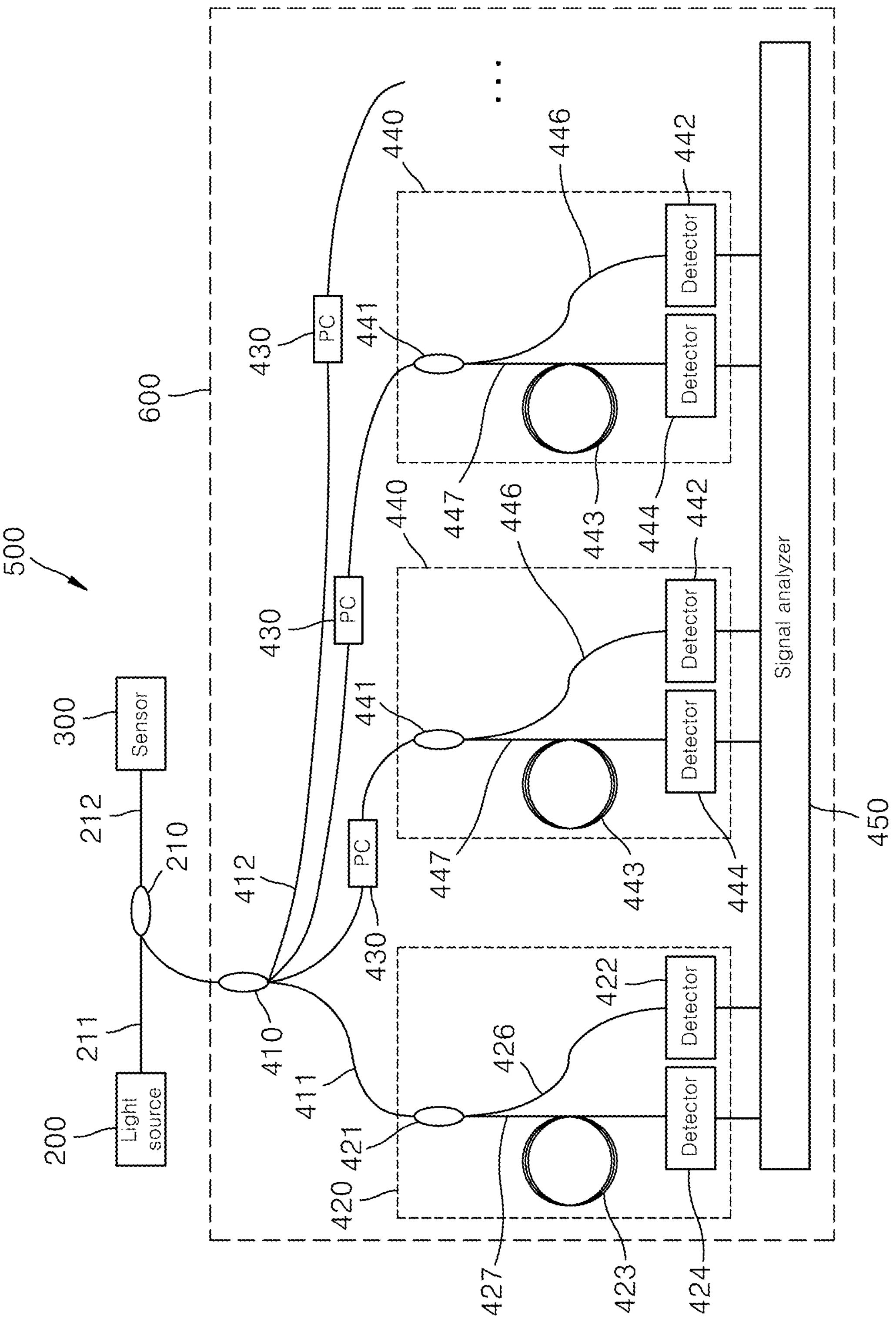
FIG. 5 is a conceptual view for an optical fiber sensor system constituted by a plurality of optical fiber filter modules according to another exemplary embodiment of the present invention.

Meanwhile, FIG. 5 illustrates an optical sensor system having an optical wavelength measuring device using a plurality of absorption-type optical fiber based multiple optical fiber filter modules according to the present invention.

Elements that perform the same function as in the previously illustrated drawings are denoted by the same reference numerals.

Referring to the drawing, the optical sensor system 500 includes a light source 200 outputting input light, an optical fiber sensor 300 installed in a measurement target, and receiving the input light from the light source 200 and outputting signal light corresponding to a physical quantity change by the measurement target, and an optical wavelength measuring device 600 detecting the signal light output from the optical fiber sensor 300 and calculating a physical quantity applied to the optical fiber sensor 300.

The optical fiber sensor 300 may adopt an optical fiber grating sensor (FBG) in which one end is connected to the first output terminal 212, and multiple gratings are formed in an optical fiber in a longitudinal direction. Meanwhile, the optical fiber sensor 300 receives the input light input through the optical branch element 210, and outputs signal light of which wavelength is changed according to the physical quantity applied from the measurement target.

The optical wavelength measuring device 600 includes a first optical splitter 410 splitting the signal light provided from the optical fiber sensor 300 into a first split light and multiple second split lights, a first optical detection unit 420 detecting the first split light output from the first optical splitter 410, multiple polarization controllers 430 installed on optical paths of the second split lights output from the first optical splitter 410, respectively and controlling a polarization state of the second split light, multiple second optical detection units 440 detecting the second split lights which are polarization-controlled by the polarization controllers 430, respectively and a calculation module 450 calculating the physical quantity applied to the optical fiber sensor 300 based on information detected by the first optical detection unit 420 and the multiple second optical detection units 440.

Therefore, the calculation module 450 compensates the optical intensity and polarization fluctuation through the first optical detection unit 420 and the multiple optical detection units 440, that is, by using multiple polarization controllers and multiple optical fiber filters using Equation 2 to enable more stable and accurate wavelength measurement, and provide an optical characteristic measuring device such as the optical fiber sensor system by using the same.

More specifically, the calculation module 450 calculates the optical signal of the signal light by using Equation 2 below.

$$R = a\log_k[(I_{r1}+I_{r2}+I_{r3}+\ldots+I_{rn})/(I_{s1}+I_{s2}+I_{s3}+\ldots+I_{sn})]+b \quad \text{[Equation 2]}$$

Here, k represents the base of the logarithmic function, a and b represent the proportionality constants and the constant, $I_{r1}$ and $I_{s1}$ represent the optical intensity of the first reference light and the optical intensity of the first analysis light detected by the first optical detection unit 420, respectively, and $I_{r2}$, $I_{r3}$, . . . , $I_{rn}$ and $I_{s2}$, $I_{s2}$, . . . , $I_{sn}$, represent the optical intensities of 2, 3, . . . , n-th reference lights and optical intensities of 2, 3, . . . , n-th analysis lights detected by the second optical detection unit 440, respectively. Therefore, the present invention enables more stable and accurate wavelength measurement by integrating and calculating the optical signals detected using multiple optical fiber filters using Equation 2.

Figure 6:
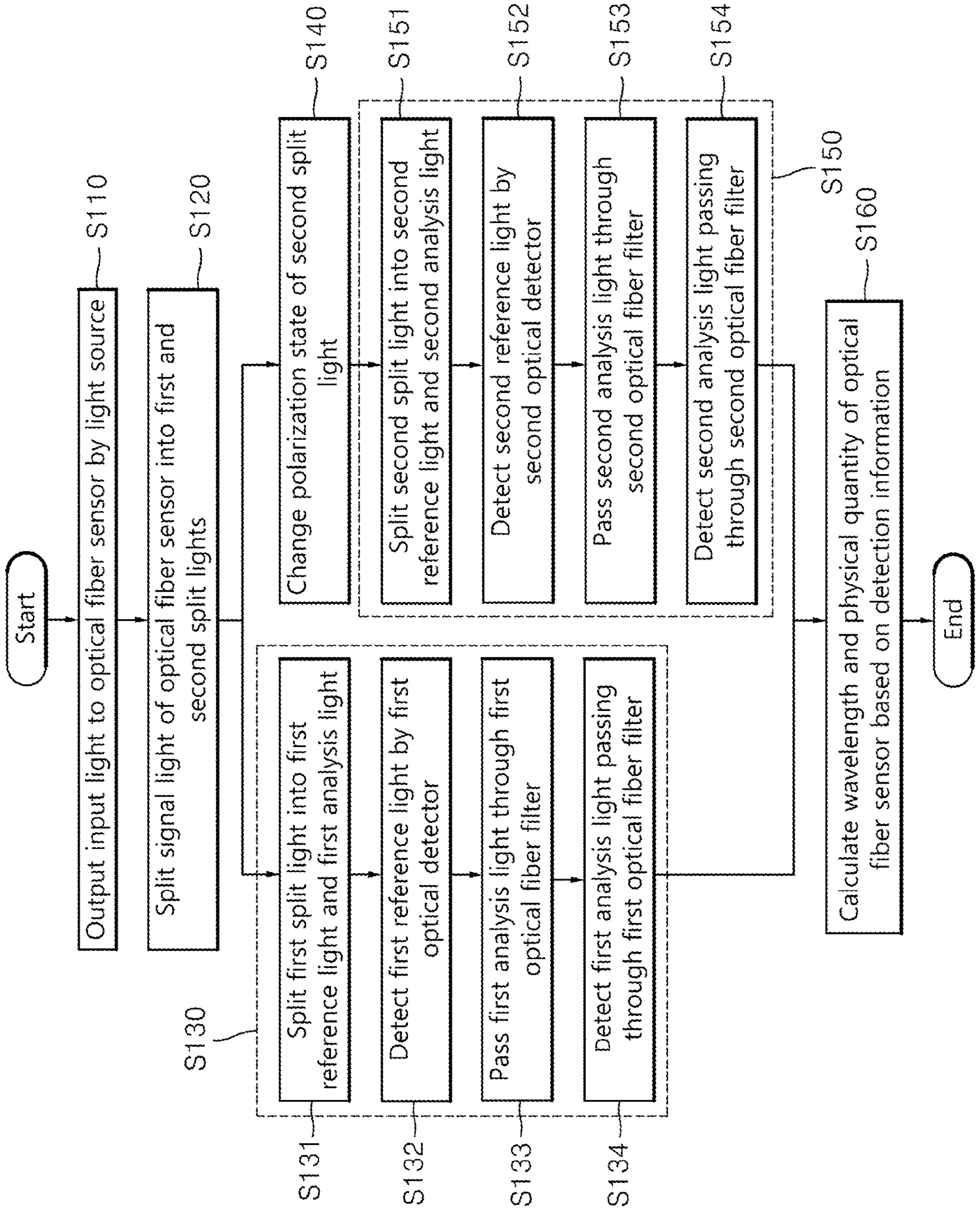
FIG. 6 is a flowchart for an optical measurement method according to the present invention.

Meanwhile, FIG. 6 illustrates an flowchart for an optical measurement method using the optical wavelength measuring device 400 using an absorption-type optical fiber based dual or multiple optical fiber filter modules according to the present invention.

Referring to the drawing, the optical measurement method includes an input light outputting step S110, a first light splitting step S120, a first light receiving step S130, a polarization control step S140, a second light receiving step S150, and a wavelength and physical quantity calculating step S160.

The input light outputting step S110 is a step of outputting, by a light source 200, input light to an optical fiber sensor 300 installed in a measurement target. The input light output from the light source 200 is input into the optical fiber sensor 300 through an optical branch element 210. Here, the optical fiber sensor 300 outputs signal light in which a wavelength is changed by a physical quantity applied from the measurement target.

The first light splitting step S120 is a step of receiving the signal output to correspond to the physical quantity applied to the optical fiber sensor 300, and splitting the signal light into first and second split lights by using a first optical splitter 410. Here, the first optical splitter 410 splits the signal light into the first and second split lights, and outputs the first and second split lights to third and fourth output terminals 411 and 412, respectively.

The first light receiving step S130 as a step of detecting the first split light split in the first light splitting step S120 includes a second light splitting step S131, a first light detecting step S132, a first filtering step S133, and a second light detecting step S134.

The second light splitting step S131 is a step of splitting the first split light into a first reference light and a first analysis light through a second optical splitter 421. Here, the second optical splitter 421 outputs the first reference light and the first analysis light to a fifth output terminal 426 and a sixth output terminal 427, respectively.

In the first light detecting step S132, the first reference light split in the second light splitting step S131 is detected by using the first optical detector 422. Further, the first optical detector 422 receives the first reference light, detects an optical intensity of the first reference light, and transmits detection information to the calculation module 450.

The first filtering step S133 is a step of passing the first analysis light split in the second light splitting step S131 through the first optical fiber filter 423. Here, the first optical fiber filter 423 has optical absorption characteristics in a predetermined optical wavelength area, and it is preferable that an optical absorption rate is linearly changed according to the optical wavelength.

The second light detecting step S134 is a step of detecting the first analysis light passing through the first optical fiber filter 423 by using a second optical detector 424. Here, the second optical detector 424 receives the first analysis light, detects an optical intensity of the first analysis light, and transmits detection information to the calculation module 450.

The polarization control step S140 is a step of controlling the polarization state of the second split light split in the first light splitting step S120 by using the polarization controller 430. The polarization controller 430 adjusts a polarization state of incident light to a predetermined polarization state, and outputs the light to the second optical detection unit 440.

The second light receiving step S150 as a step of detecting the second split light after the polarization control step S140 includes a third light splitting step S151, a third light detecting step S152, a second filtering step S153, and a fourth light detecting step S154.

The third light splitting step S151 is a step of splitting the second split light into a second reference light and a second analysis light through a third optical splitter 441. The third optical splitter 441 outputs the second reference light and the second analysis light to a seventh output terminal 446 and an eighth output terminal 447, respectively.

The third light detecting step S152 is a step of detecting the second reference light split in the third light splitting step S151 by using a third optical detector 442. Here, the third optical detector 442 receives the second reference light, detects an optical intensity of the second reference light, and transmits detection information to the calculation module 450.

The second filtering step S153 is a step of passing the second analysis light split in the third light splitting step S151 through the second optical fiber filter 443. Here, the second optical fiber filter 443 has optical absorption characteristics in a predetermined optical wavelength area, and it is preferable that an optical absorption rate is linearly changed according to the optical wavelength.

The fourth light detecting step S154 is a step of detecting the second analysis light passing through the second optical fiber filter 443 by using a fourth optical detector 444. The fourth optical detector 444 receives the second analysis light, detects an optical intensity of the second analysis light, and transmits detection information to the calculation module 450.

The wavelength and physical quantity calculating step S160 is a step of finally calculating the physical quantity applied to the optical fiber sensor 300 by calculating the optical wavelength of the signal light based on the detection information detected in the first and second light receiving steps S130 and S150. As described above, the calculation module 450 receives optical signals for the first analysis light and the first reference light provided from the fist optical detection unit 420 and receives optical signals for the second analysis light and the second reference light provided from the second optical detection unit 440, and analyzes the received optical signals to calculate the physical quantity applied to the optical fiber sensor 300, and calculates the physical quantity applied to the optical fiber sensor 300 from the calculated optical wavelength.

Figure 7:
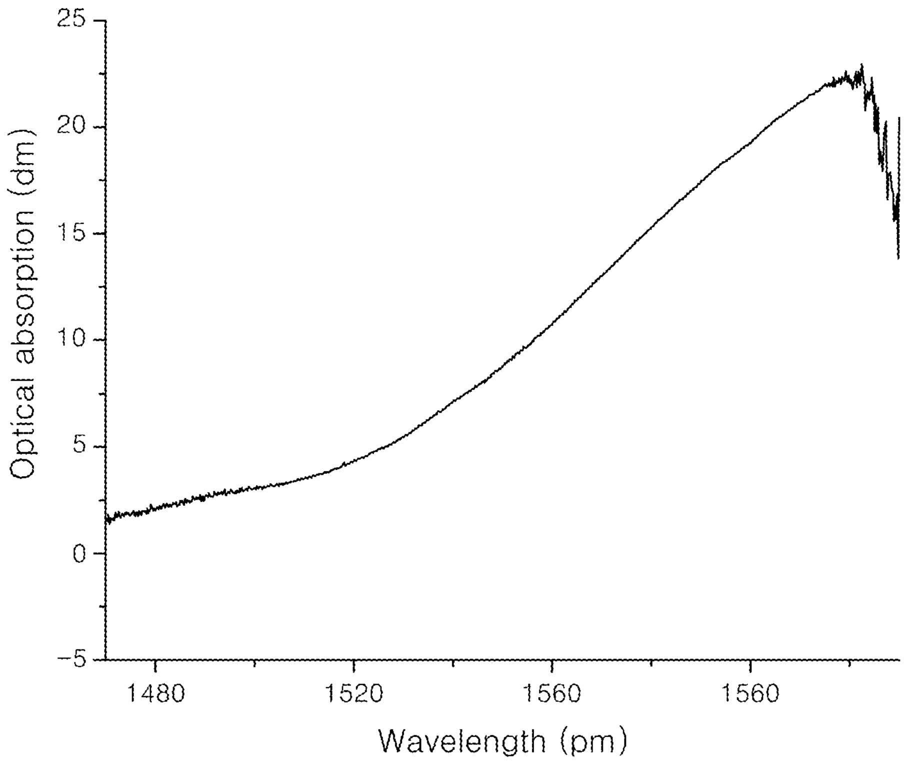
FIG. 7 relates to optical absorption spectrum of first and second optical fiber filters of the optical fiber sensor system according to the present invention.

Meanwhile, in FIG. 7, optical absorption spectrums of the first and second optical fiber filters are disclosed. Referring to the drawing, the first and second optical fiber filters has a characteristic in which an optical absorption size is monotonically increased in a broad wavelength interval from 1500 nm to 1625 nm. In the present invention, since the optical intensity is measured by using the optical absorption-type optical fiber filter by using such a characteristic, a center wavelength of the optical signal may be easily calculated.

Figure 8:
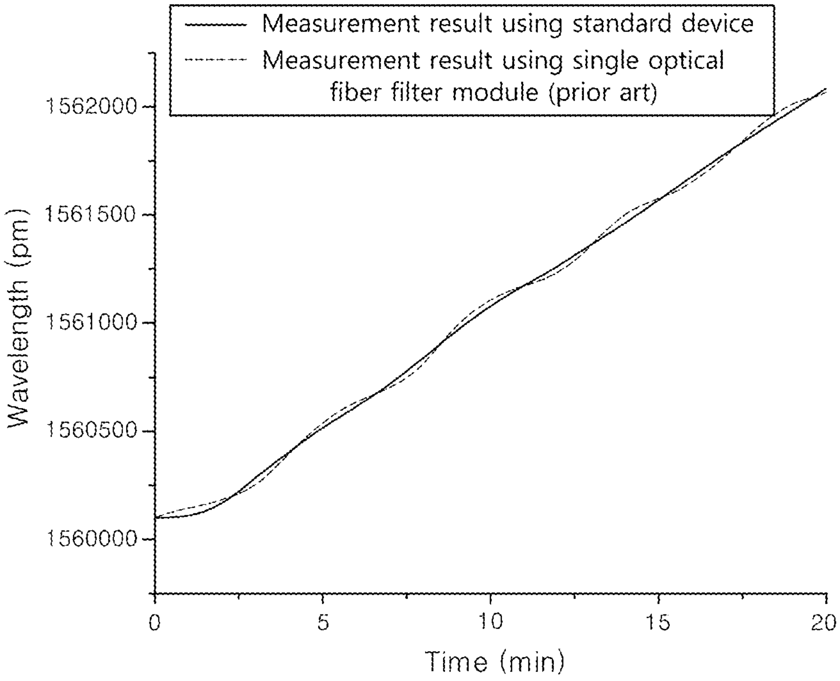
FIGS. 8 and 9 are graphs comparing an optical wavelength measured by an optical characteristic device using the single absorption-type optical fiber filter module which is the prior art illustrated in FIG. 3, and a wavelength measured by using a standard measurement device.
Figure 9:
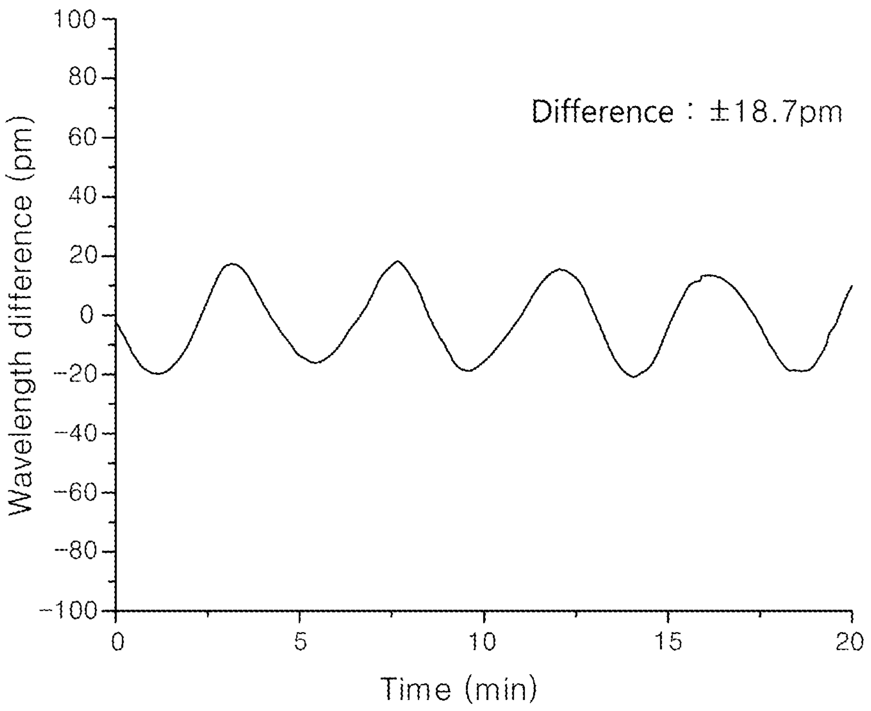

In FIG. 8, an optical wavelength measured by an optical characteristic device using the single absorption-type optical fiber filter module which is the prior art illustrated in FIG. 3, and a wavelength measured by using a standard measurement device are disclosed. In addition, in FIG. 9, a difference between the optical wavelength measured by an optical characteristic device using the single absorption-type optical fiber filter module which is the prior art illustrated in FIG. 3, and the wavelength measured by using the standard measurement device is disclosed. Referring to the drawing, it can be seen that in the optical characteristic device using the single absorption-type optical fiber filter module which is the prior art, a noise is generated in measurement data due to instability of the optical signal, and as a result, a difference of ±18.7 pm is generated as compared with data acquired by the standard measurement device.

Figure 10:
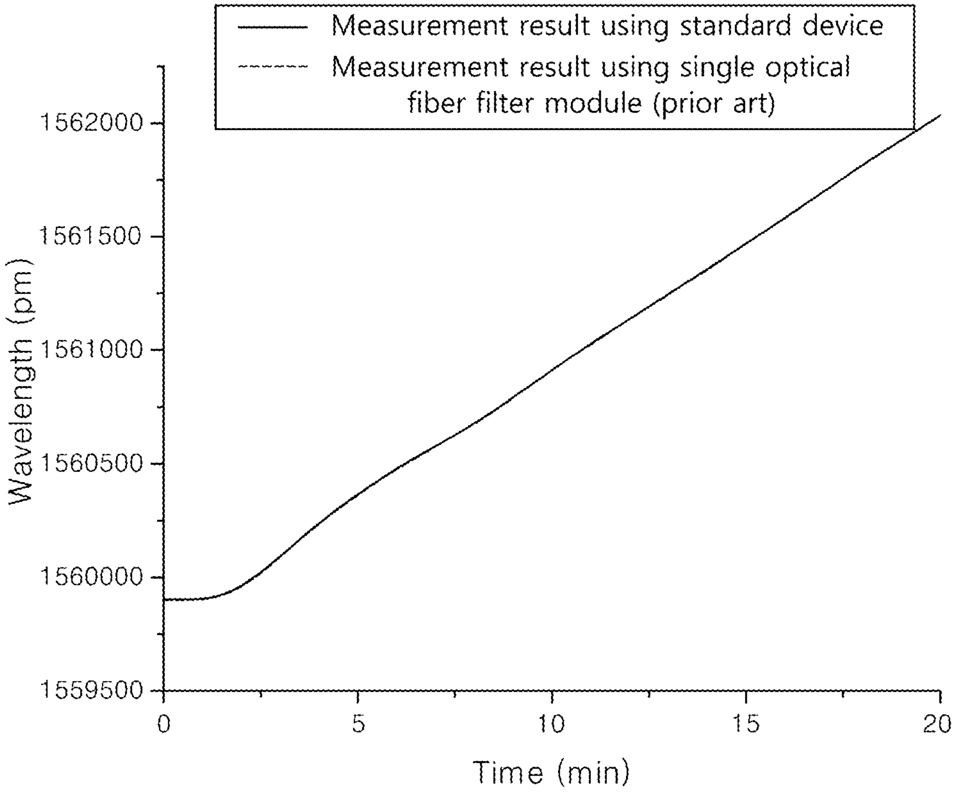
FIGS. 10 and 11 are graphs comparing an optical wavelength measured by an optical measurement device according to the present invention, and the optical wavelength measured using the standard measurement device.
Figure 11:
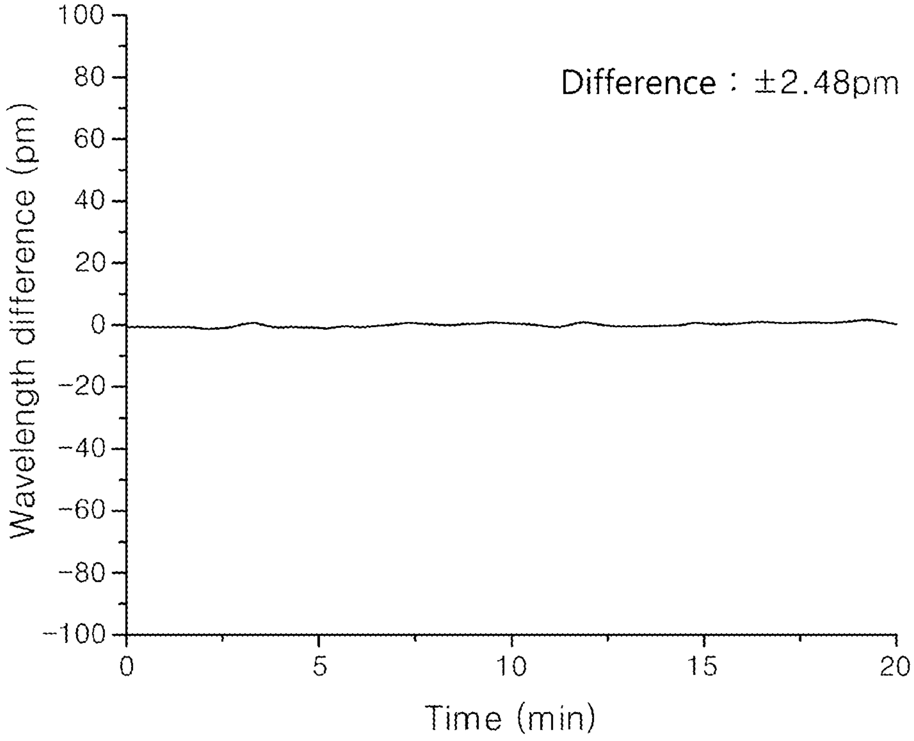

Meanwhile, in FIG. 10, an optical wavelength measured by an optical measurement device according to the present invention, and the optical wavelength measured using the standard measurement device are disclosed. In addition, in FIG. 11, a difference between the optical wavelength measured by the optical measurement device according to the present invention, and the optical wavelength measured using the standard measurement device is disclosed. Referring to the drawing, in the present invention, it can be seen that a wavelength difference is ±2.48 pm, and is significantly improved by 5 times or more as compared with the prior art according to a comparison result with the wavelength measured by the standard measurement device.

Figure 12:
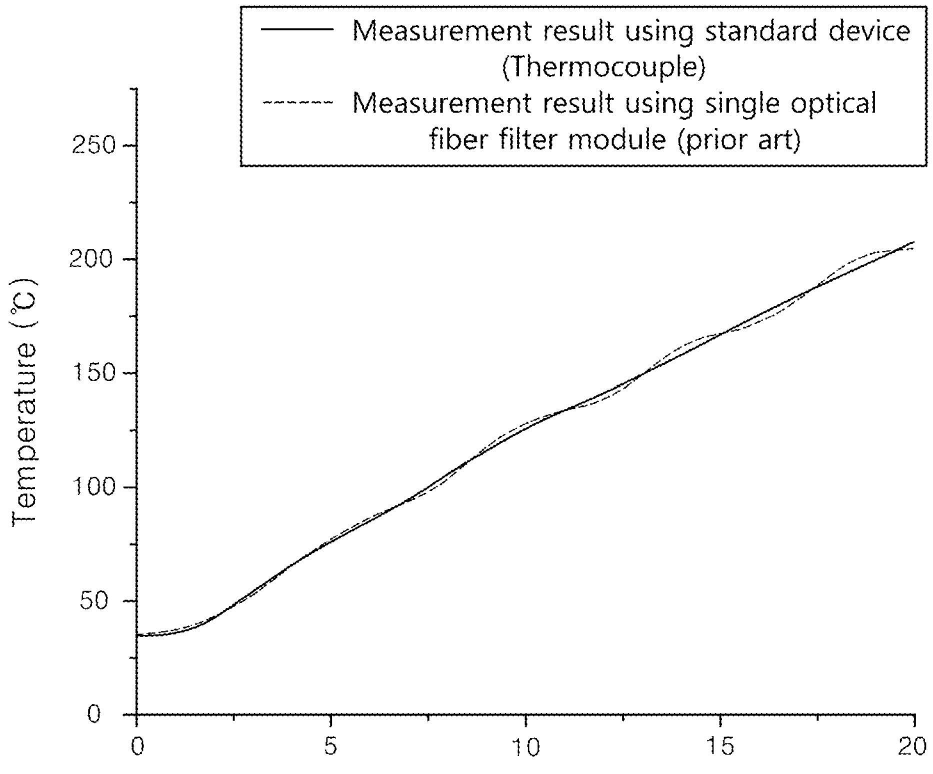
FIGS. 12 and 13 are graphs comparing a temperature value calculated by using the optical characteristic device using the single absorption-type optical fiber filter module which is the prior art illustrated in FIG. 3, and a temperature value calculated by using the standard measurement device.
Figure 13:
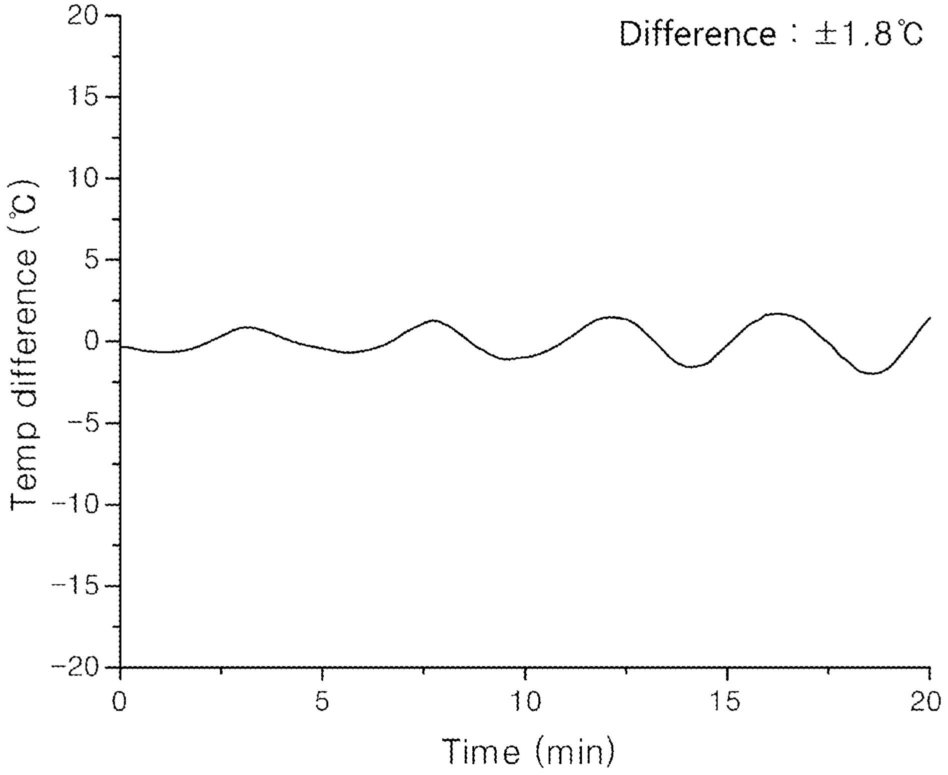

In FIG. 12, a temperature value calculated by the optical characteristic device using the single absorption-type optical fiber filter module which is the prior art illustrated in FIG. 3, and a temperature value calculated by using the standard measurement device are disclosed. In addition, in FIG. 13, a difference between the temperature value calculated by the optical characteristic device using the single absorption-type optical fiber filter module which is the prior art illustrated in FIG. 3, and the temperature value calculated by using the standard measurement device is disclosed. Referring to the drawing, it can be seen that in the optical characteristic device using the single absorption-type optical fiber filter module which is the prior art, noise is generated in measurement data due to instability of the optical signal, and as a result, a difference of ±1.8° C. is generated as compared with data acquired by the standard measurement device.

Figure 14:
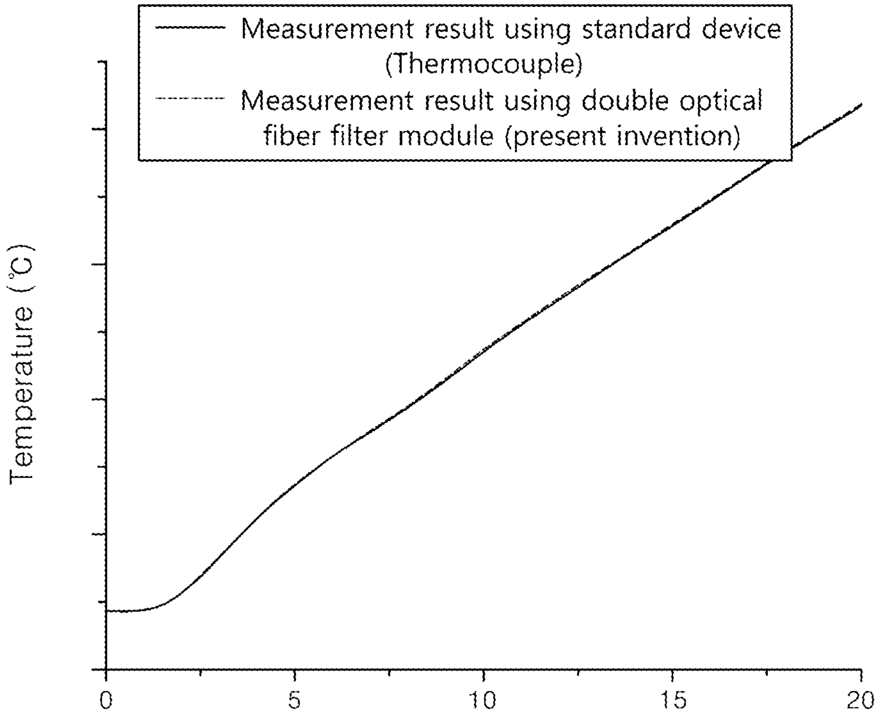
FIGS. 14 and 15 are graphs comparing the temperature calculated by the optical measurement device of the present invention, and a temperature value calculated by the standard measurement device.
Figure 15:
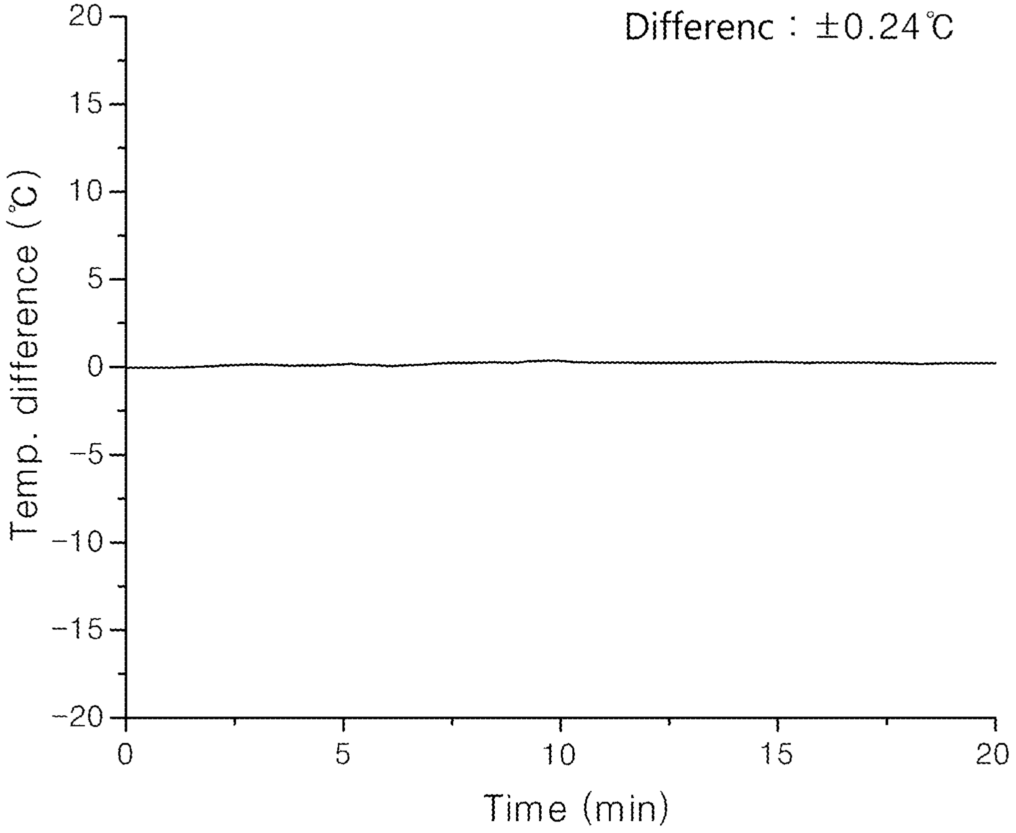

Meanwhile, in FIG. 14, the temperature value calculated by the optical measurement device according to the present invention, and the temperature value calculated by the standard measurement device are disclosed. In addition in FIG. 15, a difference between the temperature value calculated by the optical measurement device according to the present invention, and the temperature value calculated by the standard measurement device is disclosed. Referring to the drawing, in the present invention, it can be seen that a wavelength difference is ±0.24° C., and accuracy of noise characteristic measurement is significantly improved as compared with the prior art according to the comparison result with the wavelength measured by the standard measurement device.

According to the present invention, since the optical wavelength measuring device 400 using the absorption-type optical fiber-based multiple optical fiber filter module, the optical sensor system 100 having the same, and the optical measurement method detect and analyze the signal light input from the optical fiber sensor 300 using the plurality of light absorption-type optical fiber filters, it is possible to more accurately measure optical wavelengths.

Further, according to the present invention, since a light absorption-type optical fiber filter technology is used, stable and accurate measure is possible by minimizing polarization dependency of an element by compensating signal distortion by optical intensity and polarization fluctuation which becomes a problem in the conventional optical system.

In addition, according to the present invention, there is an advantage in that it is possible to accurately measure wavelengths even under an external environmental condition in which vibration, pressure, temperature, etc., are frequently changed.

The description of the presented embodiments is provided so that those skilled in the art use or implement the present invention. Various modifications of the exemplary embodiments will be apparent to those skilled in the art and general principles defined herein can be applied to other exemplary embodiments without departing from the scope of the present invention. Therefore, the present invention is not limited to the exemplary embodiments presented herein, but should be analyzed within the widest range which is coherent with the principles and new features presented herein.

What is claimed is:

1. An optical wavelength measuring device comprising multiple absorption-type optical fiber filter modules for measuring signal light generated from an optical fiber sensor of an optical fiber sensor system, the optical wavelength measuring device comprising:

a first optical splitter to split the signal light provided from the optical fiber sensor into a first split light and a second split light;

a first optical detection unit to detect the first split light outputted from the first optical splitter, wherein the first optical detection unit includes a second optical splitter to split the first split light into a first reference light and a first analysis light, a first optical detector to detect the first reference light, a first optical fiber filter installed on an optical path of the first analysis light, and a second optical detector to detect the first analysis light passing through the first optical fiber filter;

a polarization controller installed on an optical path of the second split light outputted from the first optical splitter, and the polarization controller to control a polarization state of the second split light;

a second optical detection unit to detect the second split light which is polarization- controlled by the polarization controller, wherein the second optical detection unit includes a third optical splitter to split the second split light polarization-controlled by the polarization controller into a second reference light and a second analysis light, a third optical detector to detect the second reference light, a second optical fiber filter installed on an optical path of the second analysis light, and a fourth optical detector to detect the second analysis light passing through the second optical fiber filter; and a calculation module to calculate an optical wavelength of the signal light according to a physical quantity applied to the optical fiber sensor based on information detected by the first optical detection unit and the second optical detection unit, wherein the physical quantity is calculated by measuring a shift of a center wavelength of the signal light due to environmental changes applied to the optical fiber sensor, and wherein the calculation module compensates for a polarization fluctuation in the information detected by the first optical detection unit by using the information detected by the second optical detection unit, by calculating the shift of the center wavelength based on a ratio of a sum of optical intensities of the first reference light and the second reference light to a sum of optical intensities of the first analysis light and the second analysis light.

2. The optical wavelength measuring device of claim 1, wherein the first optical fiber filter has optical absorption characteristics in a predetermined optical wavelength area.

3. The optical wavelength measuring device of claim 2, wherein an optical absorption rate of the first optical fiber filter is linearly changed according to the optical wavelength.

4. The optical wavelength measuring device of claim 1, wherein the first optical detector and the second optical detector detect optical intensities of the first reference light and the first analysis light.

5. The optical wavelength measuring device of claim 1, wherein the second optical fiber filter has optical absorption characteristics in a predetermined optical wavelength area.

6. The optical wavelength measuring device of claim 5, wherein an optical absorption rate of the second optical fiber filter is linearly changed according to the optical wavelength.

7. The optical wavelength measuring device of claim 1, wherein the third optical detector and the fourth optical detector detect optical intensities of the second reference light and the second analysis light.

8. An optical fiber sensor system comprising:

a light source to generate an input light;

an optical fiber sensor installed in a measurement target, and the optical fiber sensor to receive the input light from the light source and to output a signal light corresponding to a physical quantity change by a measurement target; and an optical wavelength measuring device to detect the signal light outputted from the optical fiber sensor and to calculate a physical quantity applied to the optical fiber sensor, wherein the optical wavelength measuring device includes:

a first optical splitter to split the signal light provided from the optical fiber sensor into a first split light and a second split light, a first optical detection unit to detect the first split light outputted from the first optical splitter, wherein the first optical detection unit includes a second optical splitter to split the first split light into a first reference light and a first analysis light, a first optical detector to detect the first reference light, a first optical fiber filter installed on an optical path of the first analysis light, and a second optical detector to detect the first analysis light passing through the first optical fiber filter, a polarization controller installed on an optical path of the second split light outputted from the first optical splitter, and the polarization controller to control a polarization state of the second split light, a second optical detection unit to detect the second split light which is polarization- controlled by the polarization controller, wherein the second optical detection unit includes a third optical splitter to split the second split light polarization-controlled by the polarization controller into a second reference light and a second analysis light, a third optical detector to detect the second reference light, a second optical fiber filter installed on an optical path of the second analysis light, and a fourth optical detector to detect the second analysis light passing through the second optical fiber filter, and a calculation module to calculate an optical wavelength of the signal light according to a physical quantity applied to the optical fiber sensor based on information detected by the first optical detection unit and the second optical detection unit, wherein the physical quantity is calculated by measuring a shift of a center wavelength of the signal light due to environmental changes applied to the optical fiber sensor, and wherein the calculation module compensates for a polarization fluctuation in the information detected by the first optical detection unit by using the information detected by the second optical detection unit, by calculating the shift of the center wavelength based on a ratio of a sum of optical intensities of the first reference light and the second reference light to a sum of optical intensities of the first analysis light and the second analysis light.

9. The optical fiber sensor system of claim 8, wherein the first optical fiber filter has optical absorption characteristics in a predetermined optical wavelength area.

10. The optical fiber sensor system of claim 9, wherein an optical absorption rate of the first optical fiber filter is linearly changed according to the optical wavelength.

11. The optical fiber sensor system of claim 8, wherein the first optical detector and the second optical detector detect optical intensities of the first reference light and the first analysis light, respectively.

12. The optical fiber sensor system of claim 8, wherein the second optical fiber filter has optical absorption characteristics in a predetermined optical wavelength area.

13. The optical fiber sensor system of claim 12, wherein an optical absorption rate of the second optical fiber filter is linearly changed according to the optical wavelength.

14. The optical fiber sensor system of claim 8, wherein the third optical detector and the fourth optical detector detect optical intensities of the second reference light and the second analysis light, respectively.

15. An optical measurement method comprising:

an input light outputting step of generating, by a light source, an input light to an optical fiber sensor installed in a measurement target;

a first light splitting step of receiving the input light from the light source, outputting a signal light corresponding to a physical quantity applied to the optical fiber sensor, and splitting the signal light into a first split light and a second split light using a first optical splitter;

a first light receiving step of detecting, using a first optical detection unit, the first split light split in the first light splitting step, wherein the first light receiving step includes:

a second light splitting step of splitting the first split light into a first reference light and a first analysis light through a second optical splitter, a first light detecting step of detecting the first reference light split in the second light splitting step by using a first optical detector, a first filtering step of passing the first analysis light split in the second light splitting step through a first optical fiber filter, and a second light detecting step of detecting the first analysis light passing through the first optical fiber filter by using a second optical detector;

a polarization control step of controlling a polarization state of the second split light split in the first light splitting step by using a polarization controller;

a second light receiving step of detecting the second split light using a second optical detection unit after the polarization control step, wherein the second light receiving step includes:

a third light splitting step of splitting the second split light into a second reference light and a second analysis light through a third optical splitter, a third light detecting step of detecting the second reference light split in the third light splitting step by using a third optical detector, a second filtering step of passing the second analysis light split in the third light splitting step through a second optical fiber filter, and a fourth light detecting step of detecting the second analysis light passing through the second optical fiber filter by using a fourth optical detector; and a wavelength and physical quantity calculating step of calculating the physical quantity applied to the optical fiber sensor using a calculation module by calculating an optical wavelength of the signal light based on information detected in the first light receiving step and the second light receiving step, wherein the physical quantity is calculated by measuring a shift of a center wavelength of the signal light due to environmental changes applied to the optical fiber sensor, and wherein the calculation module compensates for a polarization fluctuation in the information detected by the first optical detection unit by using the information detected by the second optical detection unit, by calculating the shift of the center wavelength based on a ratio of a sum of optical intensities of the first reference light and the second reference light to a sum of optical intensities of the first analysis light and the second analysis light.

16. The optical measurement method of claim 15, wherein the first optical fiber filter has optical absorption characteristics in a predetermined optical wavelength area.

17. The optical measurement method of claim 16, wherein an optical absorption rate of the first optical fiber filter is linearly changed according to the optical wavelength.

18. The optical measurement method of claim 15, wherein in the first light receiving step and the second light receiving step, optical intensities of the first reference light and the first analysis light are detected, respectively.

19. The optical measurement method of claim 15, wherein the second optical fiber filter has optical absorption characteristics in a predetermined optical wavelength area.

20. The optical measurement method of claim 19, wherein an optical absorption rate of the second optical fiber filter is linearly changed according to the optical wavelength.

21. The optical measurement method of claim 15, wherein in the third light detecting step and the fourth light detecting step, optical intensities of the second reference light and the second analysis light are detected, respectively.

* * * * *